Patented July 18, 1933

1,918,997

UNITED STATES PATENT OFFICE

HENRY J. WEILAND, OF SOUTH MILWAUKEE, WISCONSIN, ASSIGNOR, BY MESNE ASSIGNMENTS, TO E. I. DU PONT DE NEMOURS & COMPANY, A CORPORATION OF DELAWARE

PURIFICATION OF ARYLAMINES

No Drawing. Application filed December 1, 1930. Serial No. 499,410.

This invention relates to a process of isolating and purifying arylamines.

More particularly, this invention relates to such arylamines as are obtainable by the reduction of the corresponding nitroaryl bodies and comprises a process for preparing the same in a state of high purity, free from various intermediate reduction products or subsequent decomposition products which generally contaminate these arylamino bodies.

In its most specific aspects, my invention relates to the manufacture in pure form, of meta-phenylene-diamine, meta-toluylene-diamine, or other similar aromatic amines which are miscible with water in all proportions at 100° C. but are volatile at moderately elevated temperatures in a vacuum of about 28″ of mercury. By moderately elevated temperatures I means temperatures within a range of about 100 to 225° C.

It is therefore an object of this invention to provide a process for obtaining an arylamine in a high state of purity and stability.

Another object of this invention is to devise a commercially practical process of purifying relatively volatile arylamines.

A specific object of this invention is to purify aryl amino bodies by distilling them at elevated temperatures, by passing a condensable vapor through the mass.

Other and further objects will become apparent from the following description and appended claims.

The problems that have to be contended with in the manufacture of such compounds, and our novel method of solving the same, can best be explained by referring specifically to meta-phenylene-diamine and meta-toluylene-diamine as illustrations.

Meta-phenylene-diamine and meta-toluylene-diamine are generally prepared commercially by reducing the corresponding dinitro compounds with iron and an acid: For example, hydrochloric or acetic acids may be used. The product obtained in this process is invariably contaminated with various intermediate reduction products together with various decomposition products of the diamine itself. The respective iron derivatives of these products are also present. As a result of these impurities the products obtained in the above reduction process generally acquire an objectionable color upon standing. The presence of these impurities further accelerates the decomposition of the diamine itself, resulting in further contamination. This constant decomposition can be readily detected by the odor of ammonia given off by the diamine.

Various methods have been proposed heretofore for the isolation of meta-phenylene-diamine and meta-toluylene-diamine from the reaction mass in a state of high purity. None of these, however, is quite satisfactory. For example, purification by repeated crystallization from a solvent may be feasible for a small quantity in the laboratory, but it is too laborious and costly to be used on a commercial scale. Direct distillation or vacuum distillation apparently does not effect sufficient separation between the product and the impurities to form the desired pure, stable, product.

Steam distillation at ordinary temperature (100° C.) does not produce useful results. Both meta-phenylene-diamine and meta-toluylene-diamine are soluble in water in all proportions at the temperature of distillation. Consequently, when a mixture of water and one of these arylamines is heated to about 100° C., the water distills off alone carrying practically none of the arylamine with it.

I have found that meta-phenylene-diamine, meta-toluylene-diamine or analogous aromatic amines which are obtainable by reduction of corresponding nitro-aryl-bodies, and which are soluble in water in all proportions at elevated temperatures, and do not steam distill under ordinary conditions, can be readily separated from the attendant impurities by following the procedure hereinafter set forth. The products thus obtained are substantially free from the objectionable impurities and are further characterized by an exceedingly high purity and clear solubility in water.

My preferred process consists in heating meta-phenylene-diamine (or meta-toluylenediamine) to a temperature of about 180 to 210° C., at which temperature most of the moisture is driven off and the diamine body becomes molten. I then pass a condensable vapor such as superheated steam through the molten mass at about the same temperature but at ordinary pressure, and condense the gaseous mixture coming over in a suitable condenser, held at the minimum temperature required to avoid crystallization of the diamine in the condenser. The condensate is then quickly cooled by running into a cold saturated aqueous solution of the diamine, whereby the latter body crystallizes out and may be separated by filtration. The percentage of diamino body in the distillate runs as high as 15 to 40% by weight. It could not have been foreseen that such a high distillate ratio would be obtained by carrying out the distillation at these temperatures (about 180 to 210° C.), particularly in view of the fact that a similar process carried out at 100° C. gives practically no diamino body in the distillate. Nor could it have been foreseen that such a clean cut separation of the diamino body from its attendant impurities (partial reduction and condensation products) would be obtained.

To further illustrate my invention, the following specific examples are submitted, but it should be understood that my invention is not limited thereto, being capable of wide variation and modification.

*Example 1*

2,4-dinitrotoluene is reduced by any well known method, such as by the use of iron and hydrochloric acid. The finished reduction mass is made alkaline with soda-ash, filtered from iron, and the solution evaporated under a vacuum (preferably 25 to 27 inches of mercury) to substantial dryness. The dry meta-toluylene-diamine obtained is charged into a kettle and heated to 180 to 190° C. Steam is passed through the molten meta-toluylene-diamine at such a temperature that the vapors distilling will be 180 to 190° C. The vapors are passed through suitable entrainment traps and into a condenser which is maintained at a temperature high enough to hold the meta-toluylene-diamine in solution (about 55° C.). The hot condensate, containing about 20 to 25% meta-toluylene-diamine, is run into a crystallizer containing a saturated aqueous solution of meta-toluylene-diamine and a small amount of a mild reducing agent such as sodium hydrosulfite, sodium bisulfite, sulfurous acid or the like. The function of the reducing agent is to stabilize the meta-toluylene-diamine against oxidation by air. The entire mass in the crystallizer is preferably held below 10°, say at 0 to 5° C. More crude meta-toluylene-diamine may be charged into the still and the distillation made almost continuous. However, for best purposes the distillation should occasionally be interrupted and the still cleaned out to remove the small accumulated tarry residue. The cooled solution of distilled meta-toluylene-diamine is filtered and the mother liquor may be reused for subsequent recovery of a small amount of dissolved product. The filtered meta-toluylene-diamine after drying is of exceptional high quality and stability. It crystallizes in large sugar-like crystals almost pure white. The dried product is extremely stable in air and analyzes as follows:

Color in dilute HCl—water white with a pink tinge, to water white.
Ash—0.025 to 0.10%
Water-insoluble—0.03 to 0.10%
Coupling value—99.7 to 100%
Crystallizing point—97.5 to 97.9° C.
The yield is 90 to 95% of theory.

The solution obtained in the condenser (before crystallization) is characterized by exceptional stability as compared to ordinary solutions of meta-toluylene-diamine, and may be stored in drums for extended periods without decomposition.

*Example 2* m-Dinitro-benzene (melting point—89° C.) is reduced by any well known method, such as by use of iron and hydrochloric or acetic acid to meta-phenylene-diamine. The finished reduction mass is made alkaline with soda ash and the precipitated iron compounds filtered off and washed. The crude solution of meta-phenylene-diamine is then evaporated to substantial dryness in a vacuum still. The molten meta-phenylene-diamine is charged into a kettle and heated to 190 to 200° C. Steam at 190 to 200° C. and at atmospheric pressure is then passed through the hot molten oil. The vapors are scrubbed and passed directly into a condenser, so as to cool the vapors as quickly as possible to 20–30° C. The aqueous solution thus obtained contains 25 to 40% by weight of meta-phenylene-diamine and is characterized by remarkable stability. It may therefore be stored directly for future use, without danger of decomposing the meta-phenylene-diamine. If it is desired to isolate the latter in dry form, the solution is run into a cold saturated solution of meta-phenylene-diamine in water containing a little $SO_2$ and held at about 0 to 3° C. The meta-phenylene-diamine crystallizes out in small white crystals which may be separated from the mother liquor by centrifuging. The mother liquor may be returned to the evaporator for subsequent distillation and further recovery of dissolved meta-phenylene-diamine. More crude meta-phenylene-diamine may be charged into the still so as to make the process almost continuous. Occasionally the still should be cleaned out to remove an accumulated small residue. The filtered and dried meta-phenylene-diamine is of exceptionally high purity and stability. The centrifuged crystals are pure white and the dried product is light buff colored and is extremely stable in air.

Analysis of product

Water-insoluble—0.004 to 0.02%
Ash—0.02 to 0.10%
Coupling value—99.5 to 100%
Crystallizing point—62.5 to 62.8° C.
The yield is 90 to 95% of theory.

My process above may be applied to the purification of meta-phenylene-diamine and meta-toluylene-diamine apart from their process of manufacture, for instance, meta-phenylene-diamine and meta-toluylene-diamine that is on the market; or it may be applied to the aqueous reduction mass (preferably after filtering off the inorganic impurities) directly in the process of manufacturing these compounds.

Other condensable vapors than steam may be used: for instance, benzol, o-dichloro-benzol, and the like.

By the term "condensable" I mean condensable from the vapor or gaseous phase to the liquid phase at ordinary temperature and pressure as will be readily understood to those skilled in the art.

Other aromatic amines may be purified by my process, but I disclaim the application of my process to such amines as are relatively immiscible with water, for instance, aniline, since such bodies can be readily subjected to steam distillation at 100° C. or lower, in the same manner as in steam distilling any oil that is immiscible with water.

The temperature at which to carry out the distillation should be above the boiling point of water and high enough to melt the body being purified. The preferred range depends on the substance being purified, but generally will lie between 150°–225° C. In the case of meta-phenylene-diamine the optimum temperature is about 195° C., in the case of meta-toluylene-diamine it is about 185° C. In general, the temperature should preferably be as high as possible, but is limited by the increasing rate of decomposition of the organic substance being purified.

The distillation may be carried out at atmospheric pressure or at reduced or slightly increased pressures, the temperature used being varied accordingly, but it will be evident, of course, that in the absence of other special reasons, the distillation at atmospheric pressure is most economical.

I am aware that numerous details of the process may be varied through a wide range without departing from the principles of this invention, and I, therefore, do not purpose limiting the patent granted hereon otherwise than necessitated by the prior art.

I claim as my invention:

1. The process of purifying a volatile aryl amino body having a high solubility in water at elevated temperatures, which comprises passing a condensable vapor through the molten aryl amino body at a temperature above 150° C. but below temperatures at which substantial decomposition of the aryl-amino body occurs and condensing the distilled vapors.

2. In the process of purifying a volatile aryl amino body according to claim 1, the step of recovering the purified body by introducing the distillate into a cold saturated solution of said aryl amino body containing a mild reducing agent.

3. The process of purifying a volatile aryl amino body having a high solubility in water at elevated temperatures of the type obtainable by reduction of the corresponding nitro-aryl body and which is contaminated with intermediate reduction products of the nitro-aryl body, which comprises heating said body to a temperature of about 150 to 225° C., passing steam through the molten body at this temperature, condensing the distilled vapors, and recovering the aryl amino body from the condensate.

4. The process of purifying an arylene-diamine body of the benezene series, which comprises heating said body to a temperature between 180 and 210° C., passing superheated steam through the molten mass, condensing the vapors distilled over, cooling and recovering the crystallized arylene-diamine body from the condensate.

5. The process of purifying an impure meta-phenylene-diamine, which comprises heating said diamine to a temperature of about 180 to 210° C., passing superheated steam through the molten mass, condensing the vapors distilled over, cooling and isolating crystals of meta-phenylene-diamine from the condensate.

6. The process of recovering pure meta-toluylene-diamine from a reduction mass, which comprises heating said reduction mass to about 180 to 210° C., passing superheated steam through the molten mass, condensing the distilled vapors and cooling to isolate crystals of meta-toluylene-diamine from the cooled condensate.

7. The process according to claim 6 in which the meta-toluylene-diamine is isolated by passing the distillate into a cold saturated solution of meta-toluylene-diamine, cooling to 0 to 5° C. to effect crystallization and filtering off the pure meta-toluylene-diamine crystals formed.

8. In the process of separating a volatile aryl amine having high solubility in water from impurities the steps which comprise heating the aryl amine to a temperature of 150 to 225° C. and passing through the amine a condensable vapor.

9. In the process of separating from impurities an arylene diamine of the benzene series having high solubility in water the step which comprises passing steam through the arylene diamine maintained at temperatures of 150 to 225° C.

10. In the process of purifying an arylenediamine body of the benzene series according to claim 4, the step of recovering the purified body by introducing the distillate into a cold saturated solution of said arylene-diamine body containing a mild reducing agent.

11. In the process of recovering pure meta-toluylene-diamine from a reduction mass according to claim 6, the step of recovering the purified body by introducing the distillate into a cold saturated solution of said meta-toluylene-diamine containing a mild reducing agent.

HENRY J. WEILAND.